United States Patent
Kim et al.

(10) Patent No.: US 9,374,283 B2
(45) Date of Patent: Jun. 21, 2016

(54) SYSTEM AND METHOD FOR ANALYZING ONLINE GAME PACKETS

(71) Applicant: ELECTRONICS AND TELECOMMUNICATIONS RESEARCH INSTITUTE, Daejeon (KR)

(72) Inventors: Ju Young Kim, Daejeon (KR); Hang Kee Kim, Daejeon (KR); Chang Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 824 days.

(21) Appl. No.: 13/646,525

(22) Filed: Oct. 5, 2012

(65) Prior Publication Data

US 2013/0090172 A1  Apr. 11, 2013

(30) Foreign Application Priority Data

Oct. 7, 2011 (KR) .......................... 10-2011-0102298

(51) Int. Cl.
*A63F 13/12* (2006.01)
*H04L 12/26* (2006.01)
*A63F 13/30* (2014.01)

(52) U.S. Cl.
CPC .............. *H04L 43/028* (2013.01); *A63F 13/12* (2013.01); *H04L 43/18* (2013.01); *A63F 2300/534* (2013.01); *A63F 2300/535* (2013.01)

(58) Field of Classification Search
CPC .............. A63F 13/10; A63F 2300/534; A63F 2300/535; A63F 2300/5533; A63F 13/12; H04L 43/028; H04L 43/18; H04L 69/08; H04L 69/22; H04L 29/06; H04L 29/06047; H04L 29/06176

USPC .............. 370/252, 236.2, 389, 392, 394, 397, 370/399, 395.52, 395.53

See application file for complete search history.

(56) References Cited

U.S. PATENT DOCUMENTS 5,293,379 A * 3/1994 Carr ................................ 370/474
7,430,617 B2 * 9/2008 Walsh et al. .................. 709/247

(Continued)

FOREIGN PATENT DOCUMENTS

JP  2003-140988 A  5/2003
JP  2007-166453 A  6/2007

(Continued)

OTHER PUBLICATIONS

"Online Game Testing Using Scenario-based Control of Massive Virtual Users," Cho, et al., proceedings of The 12th International Conference on Advanded Communication Technology (ICACT), vol. 2, pp. 1676 to 1680, Feb. 7, 2010, ISBN 978-89-5519-146-2, http://ieeexplore.ieee.org.*

*Primary Examiner* — David L Lewis
*Assistant Examiner* — Matthew D. Hoel

(57) ABSTRACT

A system and method for analyzing an online game packet are disclosed. The system for analyzing the online game packet includes a capturing unit that captures a packet transmitted between a client terminal and a game server, and an analysis unit that analyzes the packet captured by the capturing unit, and defines, according to an analyzed result, a data field included in the packet as a static field having the same field structure or a dynamic field having a field structure according to a reference field defining an arrangement rule of a field or a field structure according to a user's request. According to the present invention, the data field of the captured packet may be defined for each type according to structural characteristics, thereby automatically analyzing the packet.

6 Claims, 9 Drawing Sheets

(56) References Cited

U.S. PATENT DOCUMENTS

| | | |
|---|---|---|
| 7,653,006 B1 | 1/2010 | Marino et al. |
| 8,505,098 B2 * | 8/2013 | Lin et al. .......................... 726/24 |
| 8,556,725 B2 * | 10/2013 | Cho et al. ......................... 463/42 |
| 8,625,642 B2 * | 1/2014 | Wood et al. ..................... 370/529 |
| 8,827,817 B2 * | 9/2014 | Kim et al. ......................... 463/43 |
| 8,868,646 B2 * | 10/2014 | Bae et al. ....................... 709/203 |
| 8,874,736 B2 * | 10/2014 | Levi et al. ..................... 709/224 |
| 2003/0081560 A1 | 5/2003 | Honda |
| 2003/0145039 A1 * | 7/2003 | Bonney et al. ................ 709/202 |
| 2003/0217144 A1 * | 11/2003 | Fu et al. ........................ 709/224 |
| 2004/0236866 A1 * | 11/2004 | Dugatkin et al. ............. 709/235 |
| 2006/0262788 A1 * | 11/2006 | Johnson et al. ............... 370/389 |
| 2007/0140295 A1 | 6/2007 | Akaboshi |
| 2009/0156314 A1 | 6/2009 | Kim et al. |
| 2011/0130205 A1 | 6/2011 | Cho et al. |

FOREIGN PATENT DOCUMENTS

| | | |
|---|---|---|
| KR | 10-2009-0065747 A | 6/2009 |
| KR | 10-2010-0102903 A | 9/2010 |
| KR | 10-2011-0061418 A | 6/2011 |

\* cited by examiner

FIG. 4

| Time Stamp | Event | Packet Data | MAX ▼ | Screen Shot |
|---|---|---|---|---|
| 00:01:30.615 | | 00 00 35 00 1C 00 00 00 EC E6 F5 05 01 00 00 00 00 00 80 09 25 43 00 00 00 00 98 6D 68 C4 0C . . 5 . . . . . . . . . . . . . . . % C . . . . . m h . | | |
| 00:01:30.810 | | 00 00 35 00 1C 00 00 00 EB E6 F5 05 01 00 00 00 00 00 D0 8D 0D 43 00 00 00 00 88 4A 63 C4 0C . . 5 . . . . . . . . . . . . . . . . . . C . . . . . J c . | | |
| 00:01:26.063 | KeyDown_SHIFT | | | |
| 00:01:27.454 | KeyDown_CONTROL | | | |
| 00:01:28.641 | KeyDown_CONTROL | | | |
| 00:01:30.657 | KeyDown_CONTROL | | | |
| 00:01:31.001 | LBUTTON Down | | | |
| 00:01:30.079 | LBUTTON Up | | | |
| 00:01:31.095 | | 00 00 20 00 2D 00 00 00 5A 02 00 00 00 00 AE 43 00 00 00 48 43 00 00 E1 C3 D0 90 71 3F 00 0C . . . . . . . . Z . . . . . . C . . . H C . . . . . . . q ? . . | | |
| 00:01:31.240 | | 00 00 2E 00 12 00 00 00 0A 00 DF E6 F5 05 FE E6 F5 05 B9 E6 F5 05 D9 E6 F5 05 . . . . . . . . . . . . . . . . . . . . . . . . . . | | |
| 00:01:31.423 | | | | |
| 00:01:31.515 | | 00 00 2E 00 12 00 00 00 0A 00 DB E6 F5 05 F3 E6 F5 05 D2 E6 F5 05 DA E6 F5 05 F2 E6 F5 05 . . . . . . . . . . . . . . . . . . . . . . . . . . . . . . | | |
| 00:01:31.698 | | 00 00 0A 00 0D 00 00 00 00 00 00 5A 02 00 00 . . . . . . . . . . . Z . . . | | |
| 00:01:31.766 | KeyDown_SHIFT | | | |
| 00:01:31.799 | | 00 00 26 03 10 00 00 00 0A 00 00 01 0A 00 32 00 CF E6 F5 05 01 00 00 00 01 00 00 00 00 0C . . _ . . . . . . . . . . . 2 . . . . . . . . . . . . . . | | |

FIG. 6
70

| Null Data 71 | 72 | 76a | 76b | 76c | 76d | 76e | 76f | 76g |
|---|---|---|---|---|---|---|---|---|
| 1C000000|Inbound-129.254.174.139/8200| | | | | | | | |
| 00 00 35 00 1C 00 00 00 | 28 E2 F5 05 | 01 00 00 00 | 00 00 00 00 | 90 9A 96 42 | 00 00 00 10 | 10 0D C3 B5 | 2B 37 3F |
| 1C000000|Inbound-129.254.174.139/8200| | | | | | | | |
| 00 00 35 00 1C 00 00 00 | 10 E9 F5 05 | 01 00 00 00 | 00 00 00 00 | 6A 66 0B 44 | 00 00 00 C0 | EC C1 C2 F1 | 6E 43 BF |
| 1C000000|Inbound-129.254.174.139/8200| | | | | | | | |
| 00 00 35 00 1C 00 00 00 | 17 E7 F5 05 | 01 00 00 00 | 00 00 00 00 | F4 10 C1 43 | 00 00 00 D0 | C7 30 C4 F3 | 04 35 BF |

FIG. 7A
76

| | | | | | |
|---|---|---|---|---|---|
| 01 | 00 00 00 00 | 64 1D AF 43 | 00 00 00 00 | A0 66 1E C2 1E 82 6A 3F 00 00 00 00 | 00 00 00 00 |
| 02 | 00 00 00 00 | 90 7A CF 42 | 00 00 00 00 | FA 52 31 C4 | 00 00 80 3F |

80 — A-TYPE DYNAMIC FIELD

| 02 00 | 00 00 00 00 | 74 B3 B6 00 | 00 00 00 00 |
| 09 00 | 00 00 00 00 | 74 B3 B6 00 | 00 00 00 00 |
| 04 00 | 00 00 00 00 | 74 B3 B6 00 | 00 00 00 00 |
| 07 00 | 00 00 00 00 | 74 B3 B6 00 | 00 00 00 00 |

B-TYPE DYNAMIC FIELD

| 05 | 01 00 00 00 01 |
| 05 | 01 00 00 00 01 |

C-TYPE DYNAMIC FIELD

80

D-TYPE DYNAMIC FIELD

E-TYPE DYNAMIC FIELD

F-TYPE DYNAMIC FIELD

FIG. 8

| Index | Packet Element | Size(Byte) | Endian | Included In Packet Size | Start Index | Value |
|---|---|---|---|---|---|---|
| 1 | Null Data | 2 | | FALSE | | |
| 2 | Packet Size | 2 | | FALSE | | |
| 3 | Protocol ID | 4 | | | | |
| 4 | Field(1~N) | | | | | |
| 5 | Checksum | | | | | |
| 6 | Dummy | | | | | |

FIG. 9

|  | Protocol ID | Size(byte) | Endian | Hexa Value |
|---|---|---|---|---|
| 1 | CS_ALIVE_PING | 4 | | 01 00 00 00 |
| 2 | CS_LOGIN_REQ | 4 | | 02 00 00 00 |
| 3 | SC_LOGIN_RES | 4 | | 03 00 00 00 |
| 4 | CS_LOGOUT_REQ | 4 | | 04 00 00 00 |
| 5 | CS_CHAR_LIST_REQ | 4 | | 05 00 00 00 |
| 6 | SC_CHAR_LIST_RES | 4 | | 06 00 00 00 |
| 7 | CS_CHAR_CREATE_REQ | 4 | | 07 00 00 00 |
| 8 | SC_CHAR_CREATE_RES | 4 | | 08 00 00 00 |
| 9 | CS_CHAR_DELETE_REQ | 4 | | 09 00 00 00 |
| 10 | SC_CHAR_DELETE_RES | 4 | | 0A 00 00 00 |

FIG. 10

| Protocol ID or Hexa Value | Protocol Field List | Type | Size(byte) | Endian |
|---|---|---|---|---|
| CS_LOGIN_REQ<br>02 00 00 00 | Requeskey<br>AccountName<br>AccountPW | uint<br>char<br>char | 4<br>17<br>17 | |
| SC_LOGIN_RES<br>03 00 00 00 | Requeskey<br>ResultCode<br>LoginID | uint<br>uchar<br>uint | 4<br>1<br>4 | |
| CS_CHAR_LIST_REQ<br>05 00 00 00 | Requeskey<br>LoginID | uint<br>uint | 4<br>4 | |
| CS_ENTER_WORLD_REQ<br>0B 00 00 00 | Requeskey<br>LoginID<br>CharID | uint<br>uint<br>uint | 4<br>4<br>4 | |
| SC_CHAR_LIST_RES<br>06 00 00 00 | <IC>CharCount<br><IL>CharInfoList | ushort<br>@CharInfo | 2 | |

SYSTEM AND METHOD FOR ANALYZING ONLINE GAME PACKETS

CLAIM FOR PRIORITY

This application claims priority to Korean Patent Application No. 10-2011-0102298 filed on Oct. 7, 2011 in the Korean Intellectual Property Office (KIPO), the entire contents of which are hereby incorporated by reference.

BACKGROUND

1. Technical Field

Example embodiments of the present invention relate in general to a system and method for analyzing packets and more specifically to a system and method for analyzing online game packets.

2. Related Art

To test stability and errors of a conventional online game server, a plurality of users are connected to the online game server to thereby test stability and errors through game play for a long period of time. However, this method requires a plurality of users to accurately test the stability and errors of the online game server, and therefore high cost is required so as to sustain such a large number of users.

To overcome the above-described problem, technologies for testing a packet capture-based online game server performance have been developed, and in the technologies, the online game server performance is tested such that ① a game packet transmitted between a client terminal and an online game server is captured, ② the captured packet is analyzed, ③ a large amount of new packets are generated by operating the packet according to the analyzed result, ④ a large amount of virtual users are generated based on the generated packets to connect to the online game server, and ⑤ a variety of instructions are given to the connected virtual user to test performance of the online game server.

In such technologies, an operator should manually perform packet analysis when the captured packet is analyzed, thereby requiring an increased period of time at the time of analysis of the packet.

In addition, in Korean Patent Application No. 10-2009-0021207 entitled "Online game quality assurance system and a method thereof, particularly for generating and controlling a virtual character based on a captured game packet," technologies in which packets of a plurality of users transmitted to the online game server are captured, and the captured packets are copied and edited to thereby generate and control a large amount of virtual users who behave similarly to an actual user are disclosed. In Korean Patent Application No. 10-2009-00118063 entitled "Game grammar-based packet capture and analysis apparatus and method for conducting game test," technologies for testing an online game server by generating packets with respect to a variety of game patterns of online game users are disclosed.

SUMMARY

Accordingly, example embodiments of the present invention are provided to substantially obviate one or more problems due to limitations and disadvantages of the related art.

Example embodiments of the present invention provide a system for analyzing an online game packet so as to automatically analyze a captured packet.

Example embodiments of the present invention provide a method for analyzing an online game packet so as to automatically analyze a captured packet.

In some example embodiments, a system for analyzing an online game packet includes: a capturing unit that captures a packet transmitted between a client terminal and a game server; and an analysis unit that analyzes the packet captured by the capturing unit, and defines, according to an analyzed result, a data field included in the packet as a static field having the same field structure or a dynamic field having a field structure according to a reference field defining an arrangement rule of a field or a field structure according to a user's request.

The capturing unit may further capture a captured time, a generated event, and a time and screen shot when the event is generated, in addition to the packet.

The analysis unit may further include a packet definition unit that defines a structure of the captured packet, a reassembling unit that reassembles the packet based on the structure defined by the packet definition unit, and a data field definition unit that classifies the data field included in the packet reassembled by the reassembling unit using a length according to the number of bytes, and defines the classified data field as the static field having the same field structure or the dynamic field having the field structure according to the reference field defining the arrangement rule of the field or the field structure according to the user's request.

The packet definition unit may classify components included in the captured packet, displays a size in the classified components of the packet, and combines session information of the game server with the packet in which the size is displayed in the components.

The data field definition unit may define, when the reference field defines the number of repetitions of a subsequent field, the data field arranged according to the number of repetitions as an A-type dynamic field, define, when the reference field defines the number of bytes to be converted into bits, the data field arranged according to the converted bits based on the number of bytes as a B-type dynamic field, define, when the reference field defines a size of the subsequent field, the data field arranged according to the defined size of the subsequent field as a C-type dynamic field, define, when the reference field defines a predetermined parameter indicating an arrangement structure of the subsequent field, the data field arranged according to the defined predetermined parameter as a D-type dynamic field, define a field having a termination condition according to a user's request among the data fields as an E-type dynamic field, and define a field having a size according to the user's request among the data fields as an F-type dynamic field.

In other example embodiments, a method for analyzing an online game packet performed by a system for analyzing an online game packet, includes: capturing a packet transmitted between a client terminal and a game server; defining a structure of the captured packet; reassembling the packet based on the defined structure of the packet; classifying a data field included in the reassembled packet using a length according to the number of bytes; and defining the classified data field as a static field having the same field structure or a dynamic field having a field structure according to a reference field defining an arrangement rule of a field or a field structure according to a user's request.

The capturing may further capture a captured time, a generated event, and a time and screen shot when the event is generated, in addition to the packet.

The defining may further include classifying components of the captured packet, displaying a size in the classified components of the packet, and combining session information of the game server with the packet in which the size is displayed in the components.

The defining of the classified data field may define, when the reference field defines the number of repetitions of a subsequent field, the data field arranged according to the number of repetitions as an A-type dynamic field, define, when the reference field defines the number of bytes to be converted into bits, the data field arranged according to the converted bits based on the number of bytes as a B-type dynamic field, define, when the reference field defines a size of the subsequent field, the data field arranged according to the defined size of the subsequent field as a C-type dynamic field, define, when the reference field defines a predetermined parameter indicating an arrangement structure of the subsequent field, the data field arranged according to the defined predetermined parameter as a D-type dynamic field, define a field having a termination condition according to a user's request among the data fields as an E-type dynamic field, and define a field having a size according to the user's request among the data fields as an F-type dynamic field.

BRIEF DESCRIPTION OF DRAWINGS

Example embodiments of the present invention will become more apparent by describing in detail example embodiments of the present invention with reference to the accompanying drawings, in which:

FIG. 4 is a drawing illustrating information captured in a system for analyzing an online game packet according to an embodiment of the present invention;

FIG. 6 is a drawing illustrating a packet which is recombined and classified;

FIGS. 7A, 7B, 7C, 7D, 7E, 7F are drawings illustrating types of a data field;

FIG. 8 is a drawing obtained by tabling components of a packet;

FIG. 9 is a drawing obtained by tabling a protocol ID that is a component of a header; and FIG. 10 is a drawing obtained by tabling a field list of a protocol ID that is a component of a header.

DESCRIPTION OF EXAMPLE EMBODIMENTS

Figure 1:
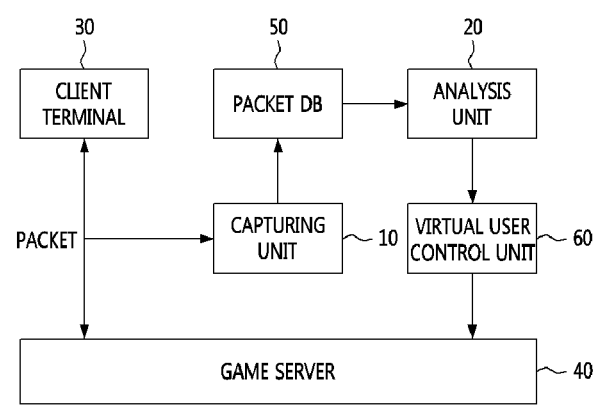
FIG. 1 is a block diagram illustrating a system for testing a load of an online game server.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, embodiments of the present invention will be described in detail with reference to the accompanying drawings.

FIG. 1 is a block diagram illustrating a system for testing a load of an online game server. The system for testing the load of the online game server includes a capturing unit 10, an analysis unit 20, a client terminal 30, a game server 40, a packet DB 50, and a virtual user control unit 60.

The client terminal 30 and the game server 40 transmit packets at the time of execution of a game, and the capturing unit 10 captures the packets transmitted between the client terminal 30 and the game server 40. The captured packet is stored in the packet DB 50, or directly provided to the analysis unit 20, and the analysis unit 20 generates a game description language based on a result obtained by analyzing the packet.

The virtual user control unit 60 generates a plurality of virtual users based on the game description language generated by the analysis unit 20 to thereby test a load of the game server 40.

Figure 2:
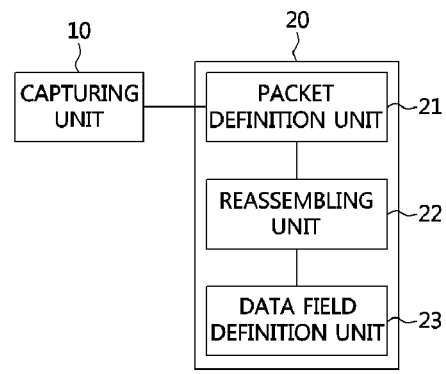
FIG. 2 is a block diagram illustrating a configuration of a system for analyzing an online game packet according to an embodiment of the present invention.

FIG. 2 is a block diagram illustrating a configuration of a system for analyzing an online game packet according to an embodiment of the present invention.

The system for analyzing the online game packet includes the capturing unit 10 and the analysis unit 20, and the analysis unit 20 includes a packet definition unit 21, a reassembling unit 22, and a data field definition unit 23.

The capturing unit 10 captures packets transmitted between the client terminal 30 and the game server 40, and may further include a captured time, a generated event, and a time and screen shot when the event is generated, in addition to the packet to thereby capture them.

In addition, the packet captured by the capturing unit 10, a time when the packet is captured, the generated event, and a time and a screen shot when the event is generated may be output through a display device (not shown).

FIG. 4 is a drawing illustrating information captured by the capturing unit 10. Here, a packet captured by the capturing unit 10, a time when the packet is captured, a generated event, and a time and screen shot when the event is generated may be output to a screen shown in FIG. 4. In FIG. 4, Time Stamp denotes the time when the packet is captured or when the event is generated, Event denotes a generated keyboard and mouse event, Packet Data denotes a packet, and Screen Shot denotes a screen shot.

The analyzing unit 20 analyzes the packet captured by the capturing unit 10, and defines a data field 76 included in the packet as a static field having the same field structure or a dynamic field having a field structure according to a reference field defining an arrangement rule of a field or a field structure according to a user's request.

The analysis unit 20 includes a packet definition unit 21, a reassembling unit 22, and a data field definition unit 23.

The packet definition unit 21 analyzes the packet captured by the capturing unit 10 to thereby analyze which components (header, trailer, data field, or the like) the packet includes.

Figure 5:
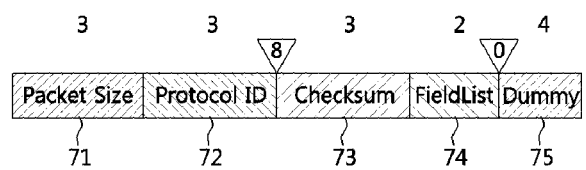
FIG. 5 is a drawing illustrating a structure of a packet in a system for analyzing an online game packet according to an embodiment of the present invention.

Referring to FIG. 5, a header according to a result obtained by analyzing the packet in the packet definition unit 21 may include a packet size 71, a protocol ID 72, a checksum 73, a field list 74, and a dummy 75, and the packet may be formed by a combination of these.

In addition, the packet definition unit 21 analyzes which components the packet includes, and then enables the components of the packet to be classified according to the analyzed result. In this instance, the components may be classified using a coloring method, and the coloring denotes display of each of the components in mutually different colors.

The packet definition unit 21 may display a size to each component of the packet which has been subjected to coloring, and for example, when a size of packet size 71 is 3 bytes, a size of the protocol ID 72 is 3 bytes, a size of the checksum 73 is 3 bytes, and a size of the dummy 75 is 4 bytes, each component of the packet may be displayed as shown in FIG. 5. However, the field list 74 does not have a size, and has only an order.

In addition, the packet definition unit 21 combines session information of the game server 40 with the packet in which the size of the component is displayed, and the session information includes Internet Protocol (IP) and target port information. The packet definition unit 21 may display a starting position of each of the checksum 73 and the dummy 75 as shown in FIG. 5 when the header includes the checksum 73 and the dummy 75. In this instance, the starting position denotes a starting position of an operation for determining a value of each of the checksum 73 and the dummy 75.

The reassembling unit 22 reassembles the packet based on the packet structure defined by the packet definition unit 21. In this instance, the packet may be reassembled based on the packet size 71. When a single packet transmitted between the client terminal 30 and the game server 40 is separated and transmitted, the reassembling unit 22 reassembles the separated and transmitted packet to thereby form a single packet, and when a plurality of packets are combined as one and transmitted, the reassembling unit 22 separates and reassembles the transmitted packets to thereby form a single packet.

The data field definition unit 23 may classify the data field 76 of the packet reassembled by the reassembling unit 22 using a length according to the number of bytes, and classify the data field 76 by performing coloring on the packet according to a field size. Referring to FIG. 6, the reassembled packet 70 includes Null Data (00 00), a packet size 71, a protocol ID 72, and a data field 76. Here, a data field 76 of an uppermost packet 70 is configured with "28 E2 F5 05 01 00 00 00 00 90 9A 96 42 00 00 00 00 10 10 0D C3 B5 2B 37 3F," "28 E2 F5 05 01 00 00 00 00 90 9A 96 42 00 00 00 00 10 10 0D C3 B5 2B 37 3F" is classified into "28 E2 F5 05," "01 00 00 00," "00 90," "9A 96 42 00," "00 00 00 10," "10 0D C3 B5," and "2B 37 3F," and each of the classified fields may be subjected to coloring with mutually different colors.

In addition, the data field definition unit 23 defines the data field 76 included in the packet captured by the capturing unit 10 as at least one type according to structural characteristics. That is, the data field 76 may define the data field as a static field and a dynamic field according to structural characteristics, and the dynamic field may be defined as A, B, C, D, E, and F types.

The static field may have the same structure of the data field 76 while a structure of the data field 76 is not changed according to a progress situation of a game or a subject to transmit the packet.

FIG. 6 is a drawing illustrating an example of a static field. The static field includes a character level field 76a having a size of 4 bytes, a channel number field 76b having a size of 4 bytes, a count field 76c having a size of 2 bytes, an X-coordinate field 76d having a size of 4 bytes, a Y-coordinate field 76e having a size of 4 bytes, a Z-coordinate field 76f having a size of 4 bytes, and a speed field 76g having a size of 4 bytes. In this manner, the data field 76 that has the same field structure without being changed according to the progress situation of the game or the subject to transmit the packet is defined as the static field.

When a reference field 80 defines the number of repetitions of a subsequent field list, the data field arranged according to the number of repetitions is defined as an A-type dynamic field. Referring to FIG. 7A, when the reference field 80 that defines the number of repetitions of the subsequent field list is "01," the subsequent field list positioned behind the reference field 80 is repeated once to be positioned, and when the reference field 80 is "02," the subsequent field list positioned behind the reference field 80 is repeated twice to be positioned.

When the reference field 80 defines the number of bytes to be converted into bits, the data field arranged according to the converted bits based on the number of bytes is defined as a B-type dynamic field. Referring to FIG. 7B, when the reference field 80 that defines the number of bytes to be converted into bits is "02 00," "00000010 00000000" may be obtained by converting "02 00" into bits, and at this time, "1" is one, and therefore one field having a size of 4 bytes (size defined by a user) is positioned behind the reference field 80. When the reference field 80 that defines the number of bytes to be converted into bits is "09 00," "00001001 00000000" may be obtained by converting "09 00" into bits, and at this time, "1" is two, and therefore two fields having a size of 4 bytes (size defined by a user) are positioned behind the reference field 80. In addition, when "04 00" that is the reference field 80 is converted into bits, "1" is one, and therefore one field having a size of 4 bytes is positioned behind the reference field 80, and when "07 00" that is the reference field 80 is converted into bits, "1" is three, and therefore three fields having a size of 4 bytes (size defined by a user) are positioned behind the reference field 80.

When the reference field 80 defines a size of the subsequent field, the data field arranged according to the size of the subsequent field is defined as a C-type dynamic field. Referring to FIG. 7C, when the reference field 80 that defines the size of the subsequent field is "05," the subsequent field positioned behind the reference field 80 has a size of 5 bytes.

Figure 7D:
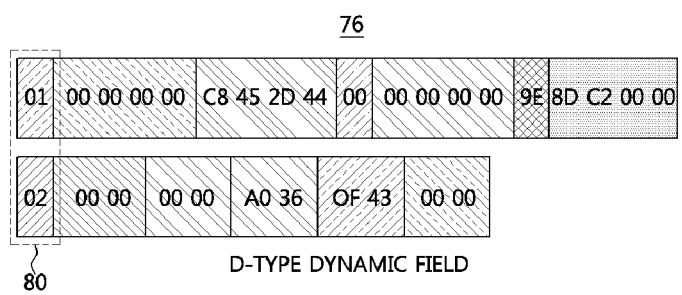

When the reference field 80 defines a predetermined parameter indicating an arrangement structure of the subsequent field, the data field arranged according to the predetermined parameter is defined as a D-type dynamic field. Referring to FIG. 7D, when the reference field 80 that defines the predetermined parameter indicating the arrangement structure of the subsequent field is "01," the subsequent field positioned behind the reference field 80 is formed as two fields (00 00 00 00, C8 45 2D 44) having sizes of 4 bytes, one field (00) having a size of 1 byte, one field (00 00 00 00) having a size of 4 bytes, one field (9E) having a size of 1 byte, and one field (8D C2 00 00) having a size of 4 bytes.

In addition, when the reference field 80 is "02," the subsequent field positioned behind the reference field 80 is formed as five fields (00 00, 00 00, A0 36, 0F 43, 00 00) having sizes of 2 bytes.

Figure 7E:
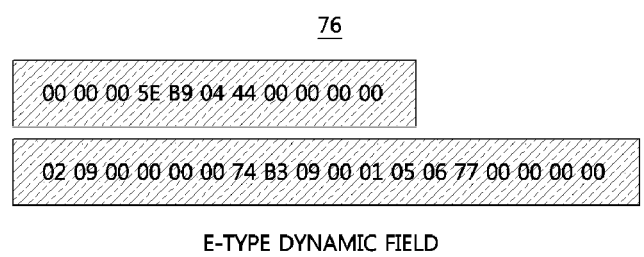

A field having a termination condition according to a user's request among the data fields 76 is defined as an E-type dynamic field. In this instance, when a user designates a starting point and a termination condition of the E-type dynamic field, a corresponding data field 76 is defined as an E-type dynamic field. Referring to FIG. 7E, when a user designates the starting point of the E-type dynamic field as a first byte of data "00 00 00," and designates a condition in which data "00 00 00 00" at a point spaced apart from the starting point by at least 7 bytes is present, as the termination condition, the E-type dynamic field may be defined as "00 00 00 50 AC 20 44 00 00 00 00." In addition, when a user designates the starting point of the E-type dynamic field as a first byte of data "02 09," and designates a condition in which data "00 00 00 00" at a point spaced apart from the starting point by at least 7 bytes is present, as the termination condition, the E-type dynamic field may be defined as "02 09 00 00 00 00 74 B3 09 00 01 05 06 77 00 00 00 00."

Figure 7F:
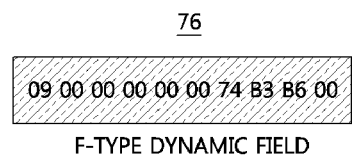

A field having a size according to a user's request among the data field 76 is defined as an F-type dynamic field. Referring to FIG. 7F, a field "09 00 00 00 00 00 74 B3 B6 00" having a size of 10 bytes according to a user's request is defined as an F-type dynamic field.

In addition, the analysis unit 20 may generate a table based on the defined static field and the dynamic field.

FIG. 8 is a drawing obtained by tabling components of a packet. A size (byte) of each component, an Endian scheme, a start index, or the like may be tabled.

FIG. 9 is a drawing obtained by tabling a protocol ID that is a component of a header. A name of each protocol ID, a size (byte), a hexa value, or the like may be tabled.

FIG. 10 is a drawing obtained by tabling a field list of a protocol ID that is a component of a header. A name of a protocol field, a type, a size (byte), or the like may be tabled. For example, a hexa value of CS_LOGIN_REQ is 02 00 00 00, and CS_LOGIN_REQ has Requeskey (unit, 4 byte), AccountName (char, 17 byte) and AccountPW (char, 17 byte) as fields.

In this manner, a game description language is generated based on a table generated based on the static field and the dynamic field in the analysis unit 20, and a virtual user is generated based on this to thereby test a performance of the online game server.

As above, the system for analyzing the online game packet according to an embodiment of the present invention has been described in detail. Hereinafter, a method for analyzing an online game packet according to an embodiment of the present invention will be described in detail.

Figure 3:
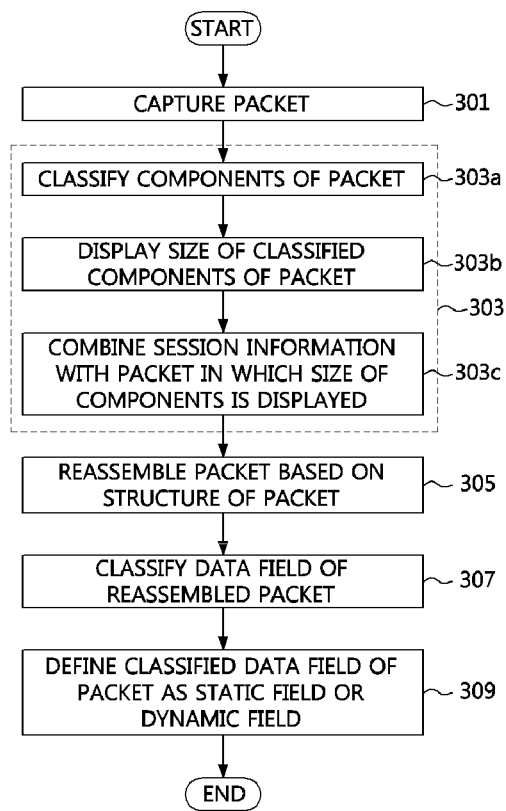
FIG. 3 is a flowchart illustrating a method for analyzing an online game packet according to an embodiment of the present invention.

FIG. 3 is a flowchart illustrating a method for analyzing an online game packet according to an embodiment of the present invention.

The method includes capturing a packet (step 301), defining a structure of the captured packet (step 303), reassembling the packet based on the defined structure of the packet (step 305), classifying a data field included in the reassembled packet (step 307), and defining the classified data field as the static field or the dynamic field (step 309). The above-described method may be performed in the system for analyzing the online game packet.

In step 301, a packet transmitted between the client terminal 30 and the game server 40 is captured, and a time when the packet is captured, a generated event, and a time and screen shot when the event is generated, in addition to the packet, are further included to thereby be captured. In step 301, the packet, the time when the packet is captured, the generated event, and the time and screen shot when the event is generated which are captured in step 301 may be output through a display device (not shown).

Referring to FIG. 4, the packet, the time when the packet is captured, the generated event, and the time and screen shot when the event is generated which are captured in step 301 may be output as a screen shown in FIG. 4 through the display device (not shown).

In addition, in FIG. 4, Time Stamp denotes the time when the packet is captured or when the event is generated, Event denotes a generated keyboard and mouse event, Packet Data denotes a packet, and Screen Shot denotes a screen shot.

In step 303, the structure of the captured packet is defined, which includes classifying components included in the captured packet (step 303a), displaying a size in the components of the packet (step 303b), and combining session information with the packet (step 303c).

In step 303a, the packet captured in step 301 is analyzed and which components (header, trailer, data field, or the like) the header includes is analyzed. Referring to FIG. 5, the packet according to the result analyzed in step 303a may include a packet size 71, a protocol ID 72, a checksum 73, a field list 74, and a dummy 75, and the packet may be formed by a combination of these. In addition, which components the packet includes is analyzed, and then the components of the packet are classified according to the analyzed result. In this instance, the components of the packet may be classified using a coloring method, and the coloring denotes display of each component with mutually different colors.

Step 303b is a step of displaying a size of each component of the packet classified in step 303a, and for example, when a size of the packet size 71 is 3 bytes, a size of the protocol ID 72 is 3 bytes, a size of a checksum 73 is 3 bytes, and a size of the dummy 75 is 4 bytes, each component of the packet may be displayed as shown in FIG. 5. However, the field list 74 does not have a size, and has only an order.

In step 303c, session information of the game server 40 is combined with the packet in which the size of each component is displayed in step 303b, and the session information includes an IP and target port information. In addition, when the session information includes the packet checksum 73 and the dummy 75, the starting position of the checksum 73 and the dummy 75 may be displayed. In this instance, the starting position denotes a starting position of an operation for determining a value of each of the checksum 73 and the dummy 75.

In step 305, the packet is reassembled based on the structure of the packet defined in step 303. In this instance, the packet is reassembled based on the packet size 71, and in step 305, when one packet transmitted between the client terminal 30 and the game server 40 is separated to be transmitted, the transmitted packet is reassembled to be formed as one packet, and when a plurality of packets are combined as one, the combined packet is separated and reassembled to be formed as one packet.

In step 307, the data field 76 of the packet reassembled in step 305 is classified using a length according to the number of bytes by performing coloring according to a size of the field. Referring to FIG. 6, the reassembled packet 70 includes Null Data (00 00), a packet size 71, a protocol ID 72, and a data field 76. Here, the data field 76 of the uppermost packet 70 is configured with "28 E2 F5 05 01 00 00 00 00 90 9A 96 42 00 00 00 00 10 10 0D C3 B5 2B 37 3F," "28 E2 F5 05 01 00 00 00 00 90 9A 96 42 00 00 00 00 10 10 0D C3 B5 2B 37 3F" is classified into "28 E2 F5 05," "01 00 00 00," "00 90," "9A 96 42 00," "00 00 00 10," "10 0D C3 B5," and "2B 37 3F" according to a field size, and each field classified as above may be subjected to coloring with mutually different colors.

In step 309, the data field 76 is defined as at least one type according to structural characteristics. That is, the data field 76 may be defined as the static field and the dynamic field according to the structural characteristics, and the dynamic field may be defined as A, B, C, D, E, and F types.

The static field may have the same structure of the data field 76 while a structure of the data field 76 is not changed according to a progress situation of a game or a subject to transmit the packet.

FIG. 6 is a drawing illustrating an example of a static field. The static field includes a character level field 76a having a size of 4 bytes, a channel number field 76b having a size of 4 bytes, a count field 76c having a size of 2 bytes, an X-coordinate field 76d having a size of 4 bytes, a Y-coordinate field 76e having a size of 4 bytes, a Z-coordinate field 76f having a size of 4 bytes, and a speed field 76g having a size of 4 bytes. In this manner, the data field 76 that has the same field structure without being changed according to the progress situation of the game or the subject to transmit the packet is defined as the static field.

When the reference field 80 defines the number of repetitions of a subsequent field list, the data field arranged according to the number of repetitions is defined as an A-type dynamic field. Referring to FIG. 7A, when the reference field 80 that defines the number of repetitions of the subsequent field list is "01," the subsequent field list positioned behind the reference field 80 is repeated once to be positioned, and when the reference field 80 is "02," the subsequent field list positioned behind the reference field 80 is repeated twice to be positioned.

When the reference field 80 defines the number of bytes to be converted into bits, the data field arranged according to the converted bits based on the number of bytes is defined as a B-type dynamic field. Referring to FIG. 7B, when the reference field 80 that defines the number of bytes to be converted into bits is "02 00," "00000010 00000000" may be obtained by converting "02 00" into bits, and at this time, "1" is one, and therefore one field having a size of 4 bytes (size defined by a user) is positioned behind the reference field 80. When the reference field 80 that defines the number of bytes to be converted into bits is "09 00," "00001001 00000000" may be obtained by converting "09 00" into bits, and at this time, "1" is two, and therefore two fields having sizes of 4 bytes (size defined by a user) are positioned behind the reference field 80. In addition, when "04 00" that is the reference field 80 is converted into bits, "1" is one, and therefore one field having a size of 4 bytes is positioned behind the reference field 80, and when "07 00" that is the reference field 80 is converted into bits, "1" is three, and therefore three fields having sizes of 4 bytes (size defined by a user) are positioned behind the reference field 80.

When the reference field 80 defines a size of the subsequent field, the data field arranged according to the size of the subsequent field is defined as a C-type dynamic field. Referring to FIG. 7C, when the reference field 80 that defines the size of the subsequent field is "05," the subsequent field positioned behind the reference field 80 has a size of 5 bytes.

When the reference field 80 defines a predetermined parameter indicating an arrangement structure of the subsequent field, the data field arranged according to the predetermined parameter is defined as a D-type dynamic field. Referring to FIG. 7D, when the reference field 80 that defines the predetermined parameter indicating the arrangement structure of the subsequent field is "01," the subsequent field positioned behind the reference field 80 is formed as two fields (00 00 00 00, C8 45 2D 44) having sizes of 4 bytes, one field (00) having a size of 1 byte, one field (00 00 00 00) having a size of 4 bytes, one field (9E) having a size of 1 byte, and one field (8D C2 00 00) having a size of 4 bytes.

In addition, when the reference field 80 is "02," the subsequent field positioned behind the reference field 80 is formed as five fields (00 00, 00 00, A0 36, 0F 43, 00 00) having sizes of 2 bytes.

A field having a termination condition according to a user's request among the data fields 76 is defined as an E-type dynamic field. In this instance, when a user designates a starting point and a termination condition of the E-type dynamic field, a corresponding data field 76 is defined as an E-type dynamic field. Referring to FIG. 7E, when a user designates the starting point of the E-type dynamic field as a first byte of data "00 00 00," and designates a condition in which data "00 00 00 00" at a point spaced apart from the starting point by at least 7 bytes is present, as the termination condition, the E-type dynamic field may be defined as "00 00 00 50 AC 20 44 00 00 00 00." In addition, when a user designates the starting point of the E-type dynamic field as a first byte of data "02 09," and designates a condition in which data "00 00 00 00" at a point spaced apart from the starting point by at least 7 bytes is present, as the termination condition, the E-type dynamic field may be defined as "02 09 00 00 00 00 74 B3 09 00 01 05 06 77 00 00 00 00."

A field having a size according to a user's request among the data field 76 is defined as an F-type dynamic field. Referring to FIG. 7F, a field "09 00 00 00 00 00 74 B3 B6 00" having a size of 10 bytes according to a user's request is defined as an F-type dynamic field.

In addition, the method for analyzing the online game packet may further include generating a table based on the defined static field and dynamic field.

FIG. 8 is a drawing obtained by tabling components of a packet. A size (byte) of each component, an Endian scheme, a start index, or the like may be tabled.

FIG. 9 is a drawing obtained by tabling a protocol ID that is a component of a header.

A name of each protocol ID, a size (byte), a hexa value, or the like may be tabled.

FIG. 10 is a drawing obtained by tabling a field list of a protocol ID that is a component of a header. A name of a protocol field, a type, a size (byte), or the like may be tabled. For example, a hexa value of CS_LOGIN_REQ is 02 00 00 00, and CS_LOGIN_REQ has Requeskey (unit, 4 byte), AccountName (char, 17 byte) and AccountPW (char, 17 byte) as fields.

In this manner, a game description language is generated based on a table generated based on the static field and the dynamic field in the analysis unit 20, and a virtual user is generated based on this to thereby test a performance of the online game server.

As described above, according to the present embodiments, the data field of the captured packet may be defined for each type according to the structural characteristics, and therefore the packet may be automatically analyzed. That is, the packet may be automatically analyzed using the data field defined for each type according to the structural characteristics, and thereby required time may be significantly reduced compared to when an operator manually analyzes the captured packet, and a time required for testing the performance of the online game server may be significantly reduced.

While the example embodiments of the present invention and their advantages have been described in detail, it should be understood that various changes, substitutions and alterations may be made herein without departing from the scope of the invention.

What is claimed is:

1. A system for analyzing an online game packet comprising:
    a capturing unit that captures a packet transmitted between a client terminal and a game server; and
    an analysis unit that analyzes the packet captured by the capturing unit, and defines, according to an analyzed result, a data field included in the packet as a static field having the same field structure or a dynamic field having a field structure according to a reference field defining an arrangement rule of a field or a field structure according to a user's request,
    wherein the analysis unit further includes:
        a packet definition unit that defines a structure of the captured packet,
        a reassembling unit that reassembles the packet based on the structure defined by the packet definition unit, and
        a data field definition unit that classifies the data field included in the packet reassembled by the reassembling unit using a length according to the number of bytes, and defines the classified data field as the static field or the dynamic field, and
    wherein the data field definition unit defines, when the reference field defines the number of repetitions of a subsequent field, the data field arranged according to the number of repetitions as an A-type dynamic field, defines, when the reference field defines the number of bytes to be converted into bits, the data field arranged according to the converted bits based on the number of bytes as a B-type dynamic field, defines, when the reference field defines a size of the subsequent field, the data field arranged according to the defined size of the subsequent field as a C-type dynamic field, defines, when the reference field defines a predetermined parameter indicating an arrangement structure of the subsequent field, the data field arranged according to the defined predetermined parameter as a D-type dynamic field, defines a field having a termination condition according to a user's request among the data fields as an E-type dynamic field, and defines a field having a size according to the user's request among the data fields as an F-type dynamic field.

2. The system for analyzing the online game packet according to claim 1, wherein the capturing unit further captures a captured time, a generated event, and a time and screen shot when the event is generated, in addition to the packet.

3. The system for analyzing the online game packet according to claim 1, wherein the packet definition unit classifies components included in the captured packet, displays a size in the classified components of the packet, and combines session information of the game server with the packet in which the size is displayed in the components.

4. A method for analyzing an online game packet performed by a system for analyzing an online game packet, comprising:
    capturing a packet transmitted between a client terminal and a game server;
    defining a structure of the captured packet;
    reassembling the packet based on the defined structure of the packet;
    classifying a data field included in the reassembled packet using a length according to the number of bytes; and
    defining the classified data field as a static field having the same field structure or a dynamic field having a field structure according to a reference field defining an arrangement rule of a field or a field structure according to a user's request,
    wherein the defining of the classified data field includes defining, when the reference field defines the number of repetitions of a subsequent field, the data field arranged according to the number of repetitions as an A-type dynamic field, defining, when the reference field defines the number of bytes to be converted into bits, the data field arranged according to the converted bits based on the number of bytes as a B-type dynamic field, defining, when the reference field defines a size of the subsequent field, the data field arranged according to the defined size of the subsequent field as a C-type dynamic field, defining, when the reference field defines a predetermined parameter indicating an arrangement structure of the subsequent field, the data field arranged according to the defined predetermined parameter as a D-type dynamic field, defining a field having a termination condition according to the user's request among the data fields as an E-type dynamic field, and defining a field having a size according to the user's request among the data fields as an F-type dynamic field.

5. The method for analyzing the online game packet according to claim 4, wherein the capturing further comprises capturing a captured time, a generated event, and a time and screen shot when the event is generated.

6. The method for analyzing the online game packet according to claim 4, wherein the defining further includes:
    classifying components of the captured packet,
    displaying a size in the classified components of the packet, and
    combining session information of the game server with the packet in which the size is displayed in the components.

* * * * *